United States Patent
Nakai et al.

(10) Patent No.: US 6,962,140 B1
(45) Date of Patent: Nov. 8, 2005

(54) DIESEL ENGINE CONTROL SYSTEM AND CONTROL METHOD

(75) Inventors: Eiji Nakai, Hiroshima (JP); Naoki Okada, Hiroshima (JP); Tsunehiro Sato, Hiroshima (JP); Yoshiyuki Matsumoto, Hiroshima (JP); Masami Nakao, Hiroshima (JP); Masanori Sahara, Hiroshima (JP); Kouji Habu, Hiroshima (JP); Hiromu Sugano, Hiroshima (JP); Masaru Yamamoto, Hiroshima (JP); Tunehiro Mori, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/656,100

(22) Filed: Sep. 8, 2003

Related U.S. Application Data

(63) Continuation of application No. PCT/JP02/06935, filed on Jul. 9, 2002.

(30) Foreign Application Priority Data

Jul. 13, 2001 (JP) .............................. 2001-214536

(51) Int. Cl.$^7$ ............................................ F02D 41/14
(52) U.S. Cl. ...................... 123/436; 123/478; 123/480; 123/687
(58) Field of Search ............................... 123/357, 435, 123/436, 478, 480, 490, 674, 687

(56) References Cited

U.S. PATENT DOCUMENTS

| | | | |
|---|---|---|---|
| 5,150,694 A * | 9/1992 | Currie et al. ............... | 123/687 |
| 5,383,086 A | 1/1995 | Wietelmann et al. | |
| 5,743,243 A * | 4/1998 | Yanagihara ............ | 123/568.12 |
| 5,771,861 A | 6/1998 | Musser et al. | |
| 5,992,391 A | 11/1999 | Yamakado et al. | |
| 6,050,240 A * | 4/2000 | Saiki et al. .................. | 123/357 |
| 6,053,150 A | 4/2000 | Takahashi et al. | |
| 6,244,241 B1 | 6/2001 | Mamiya et al. | |
| 6,354,268 B1 * | 3/2002 | Beck et al. .................. | 123/435 |

FOREIGN PATENT DOCUMENTS

| | | |
|---|---|---|
| EP | 0 937 881 A2 | 8/1999 |
| EP | 1 085 191 A2 | 3/2001 |
| JP | 11-287149 | 10/1999 |
| JP | 11-343911 | 12/1999 |
| JP | 2000-227036 | 8/2000 |
| JP | 2001-98991 | 4/2001 |

* cited by examiner

Primary Examiner—Tony M. Argenbright
(74) Attorney, Agent, or Firm—Nixon Peabody LLP; Donald R. Studebaker

(57) ABSTRACT

A diesel engine control system and control method capable of conducting accurate fuel injection unaffected by variations in injector performance caused by differences among individual injectors or change with aging. The diesel engine control system includes an injector for directly injecting fuel into a combustion chamber of a diesel engine, injection quantity controller for controlling fuel injection quantity by varying a period of electric current supply to the injector, estimator for estimating that an electric current supply period when a prescribed (stable) combustion state is obtained is the current supply period for injecting the amount of fuel required for the prescribed combustion state, and control data correcting device for correcting control data of the injection quantity controller based on the estimated current supply period.

12 Claims, 10 Drawing Sheets

FIG. 2
1 
2 
3 
4 

DIESEL ENGINE CONTROL SYSTEM AND CONTROL METHOD

This application is a Continuation of International Application No. PCT/JP02/06935, filed Jul. 9, 2002. (status, pending).

TECHNICAL FIELD

The present invention relates to a control system and a control method for a diesel engine, particularly to a control system and a control method enabling accurate injection of small quantities of fuel in a diesel engine.

BACKGROUND ART

In a diesel engine, the fuel injection quantity is controlled by varying the time period of electric current supply to one or more fuel injectors so as to vary the fuel injection time period. Accurate fuel injection is difficult, however, because the relationship between current supply period and fuel injection quantity differs between different injectors owing to differences in the performance of individual injectors, change with aging and the like. This difficulty is particularly pronounced in the low-load, low-rpm region where the injection quantity per injection is small and in split fuel injection that divides the amount of fuel injected during each stroke into two or more injections.

Japanese Patent Unexamined Publication No. 11-287149, having counterpart U.S. Pat. No. 6,053,150 and EP publication No.947686, teaches a device for overcoming this problem that detects the minimum current supply period required for fuel injection by determining the start of pilot fuel injection from change in common rail pressure.

On the other hand, Japanese Patent Unexamined Publication No. 11-343911, having counterpart U.S. Pat. No. 6,244,241 and EP publication No. 947684, teaches a device that estimates injection quantity per injection based on the output of an $O_2$ sensor for detecting air-fuel ratio and detects the relationship between current supply period and injection quantity from the estimated injection quantity and the width of the injection pulse (current supply period) output at the time of injection. Japanese Patent Unexamined Publication Nos. 2000-227036 and 2001-98991 also teach same device.

The device of Publication No. 11-287149 cannot accurately detect fuel injection in the small injection region because the common rail pressure is affected by dynamic factors and the like. Moreover, while this device can detect the lower limit value of the current supply period required for fuel injection, it cannot accurately detect whether a quantity of fuel enabling ignition was injected, i.e., cannot accurately detect the lower limit of the current supply period required for stable ignition.

The device of Publication No. 11-343911 utilizes an $Q_2$ sensor for air-fuel ratio feedback control that is peculiar to a gasoline engine and cannot be directly applied to a diesel engine.

An object of the present invention is to provide a diesel engine control system and control method that enable accurate fuel injection even at times of small quantity injection such as pilot injection.

Another object of the present invention is to provide a diesel engine control system and control method capable of conducting accurate fuel injection unaffected by variations in injector performance caused by differences among individual injectors or change with aging.

DISCLOSURE OF THE INVENTION

The present invention provides a diesel engine control system comprising: an injector for directly injecting fuel into a combustion chamber of a diesel engine; injection quantity controlling means for controlling fuel injection quantity by varying a period of electric current supply to the injector; estimating means for estimating that an electric current supply period when a prescribed (stable) combustion state is obtained is the current supply period for injecting the amount of fuel required for the prescribed combustion state; and control data correcting means for correcting control data of the injection quantity controlling means based on the estimated current supply period.

The estimating means preferably estimates the current supply period during prescribed low-load, low-rpm operation.

Preferably, the diesel engine is responsive to a prescribed operating state for conducting split fuel injection that divides the amount of fuel injected during each cycle into multiple injections and the estimating means makes the estimation during split fuel injection.

In this case, the per-cycle, per-cylinder fuel injection quantity (the required injection quantity) that is necessary during idling or other prescribed low-load, low-rpm operating state in order to achieve a stable operating state, i.e., an operating state marked by stable ignition and autonomous rotation produced by steady, stable combustion (the prescribed combustion state), is determined substantially uniquely by the engine specifications etc. to be, for example, 5 cubic millimeters and the period of electric current supply to the injectors is determined with reference to this quantity. This required injection quantity of, for example, 5 cubic millimeters is divided into portions injected in multiple injection steps. The injection quantity in each of the multiple injection steps is determined in accordance with the splitting ratio and the current supply period for each injection step is determined accordingly.

As a result, stable injection of small quantities of fuel without influence from variations in injector performance caused by differences among individual injectors or change with aging can be achieved through control of the current supply period by conducting the split fuel injection in the prescribed low-load, low-rpm operating state using the current supply period based on the splitting ratio, regulating the current supply period to achieve a stable operating state (the prescribed combustion state) and regulating the fuel injection control by defining the current supply period of at least the injection step in which the injection quantity is minimum when the stable operating state is achieved as the current supply period corresponding to the injection quantity of that injection step, thereby enabling accurate regulation of the lower limit of the current supply period in the small injection region and of the injection quantity-current supply period characteristic within the practical region, without giving the driver the impression that something is unusual during operation of the diesel engine.

The estimating means and the control data correcting means preferably conduct current supply period estimation and control data correction at multiple fuel injection pressures. As this makes it possible to correct for different injection pressures within the practical region, it enables response to changes in operating state.

The control data correcting means preferably calculates deviation between a preset basic current supply period and the estimated current supply period and, based on the calculated deviation, corrects the control data at injection pressures other than said multiple fuel injection pressures. This enables the relationship between the period of current supply to the injector and the injection quantity in the range of injection pressure change of the practical region to be corrected in a small number of steps.

The estimating means preferably decides that the engine is in the prescribed combustion state when a prescribed engine speed is obtained. Preferably, the diesel engine is equipped with multiple cylinders and the estimating means and control data correcting means estimate the current supply period and correct the control data separately for each cylinder.

In another aspect, the present invention provides a diesel engine control system comprising: an injector for directly injecting fuel into a combustion chamber of a diesel engine; injection quantity controlling means for controlling fuel injection quantity by varying a period of electric current supply to the injector; pilot injection control means operative in a prescribed operating state for causing the injector to conduct pilot injection of an injection quantity smaller than an injection quantity of a main injection prior to the main injection of fuel; misfire generating means for generating a misfire state by varying the current supply period to change the injection quantity of the pilot injection; misfire discriminating means for discriminating misfire state; misfire limit setting means for setting the period of current supply to the injector when misfire is detected as a misfire limit current supply period; and pilot control correcting means for correcting control data of the pilot injection control means based on the misfire limit current supply period.

In this configuration, when the diesel engine is in an idling or other prescribed low-load, low-rpm operating state, the injection time point is retarded to the limit at which misfire would occur should pilot injection be stopped without changing the per-cycle injection quantity from that in the state in which ignition stability is obtained with pilot injection. In this state, the relationship between the current supply period and the injection quantity of each injector is detected by varying the period of current supply to the injector without changing the per-cycle injection quantity and detecting the actual limit of misfire occurrence (lower limit of current supply period), whereafter the fuel injection control is corrected based on the detection result. As a result, stable pilot injection control and the like can be achieved unaffected by variation among individual injectors or change with aging.

The misfire discriminating means preferably discriminates misfire based on the rotational speed of the crankangle.

Preferably, the diesel engine is equipped with multiple cylinders and the misfire discriminating means discriminates misfire state based on difference in the crankshaft rotational speed at the time of explosion in the misfiring cylinder and the crankshaft rotational speed at the time of explosion in another cylinder.

The misfire discriminating means preferably discriminates occurrence of misfire state when the difference is equal to or greater than a prescribed value. The pilot control correcting means preferably sets a period obtained by adding a prescribed period to the misfire limit current supply period as the lower limit value of the current supply period for pilot injection. The misfire generation, misfire discrimination, misfire limit setting and pilot control correction are each preferably conducted at multiple fuel injection pressures. Preferably, the diesel engine is equipped with multiple cylinders and the misfire generation, misfire discrimination, misfire limit setting and pilot control correction are conducted separately for each cylinder.

In another aspect, the present invention provides a diesel engine control method that controls fuel injection quantity by varying a period of electric current supply to an injector for directly injecting fuel into a combustion chamber, the method comprising: a step of estimating that the electric current supply period when a prescribed combustion state is obtained is a current supply period for injecting an amount of fuel required for the prescribed combustion state; and a step of correcting control data of an injection quantity controlling means based on the estimated current supply period.

In another aspect, the present invention provides a diesel engine control method that controls fuel injection quantity by varying a period of electric current supply to an injector for directly injecting fuel into a combustion chamber, the method comprising: a step conducted in a prescribed operating state of causing the injector to conduct pilot injection of an injection quantity smaller than an injection quantity of a main injection prior to the main injection of fuel; a step of generating a misfire state by varying the current supply period to change the injection quantity of the pilot injection; a step of discriminating misfire state; a step of setting the period of current supply to the injector when misfire is detected as a misfire limit current supply period; and a step of correcting control data of the pilot injection control means based on the misfire limit current supply period.

BRIEF DESCRIPTION OF THE DRAWINGS

FIG. 2 is a time chart showing an injection state in the first embodiment of the present invention.

BEST MODE OF CARRYING OUT THE INVENTION

First Embodiment

Figure 1:
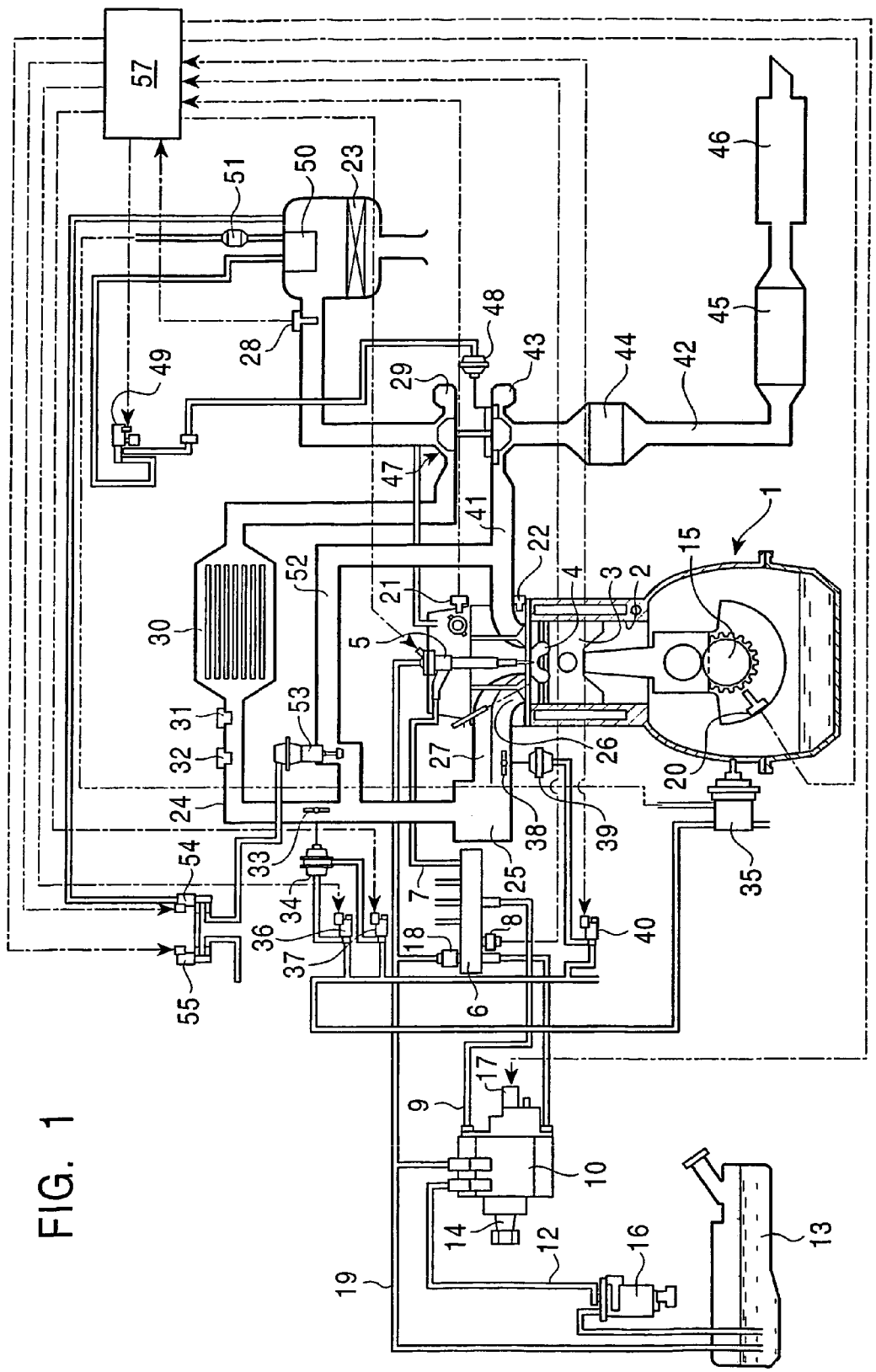
FIG. 1 is a schematic diagram showing the overall configuration of a diesel engine control system that is a first embodiment of the present invention.

FIG. 1 is a schematic diagram showing the overall configuration of a diesel engine control system that is a first embodiment of the present invention. This embodiment represents an application of the present invention to an in-line, four-cylinder, direct-injection diesel engine mounted in a vehicle.

In FIG. 1, reference numeral 1 designates a main engine unit controlled by the control system of this embodiment. The main engine unit 1 is equipped with four cylinders 2 aligned perpendicularly to the drawing sheet. A piston 3 is installed in each cylinder 2 to be reciprocally movable therein. The top face of each piston 3 is formed with a recess 4 forming part of a combustion chamber. A solenoid-type injector (fuel injection valve) 5 is installed at the top center of each cylinder 2 for directly injecting fuel into the cylinder.

The injectors 5 are connected to a common rail 6 through branch pipes 7. The common rail 6 stores fuel at a higher pressure than the opening pressure of the core valves of the injectors 5 and distributes this fuel to injectors 5. When current is supplied to an injector 5 magnetic force is produced that opens the fuel passage so that the core valve of the injection nozzle is opened by the pressure of the fuel from the common rail 6. The fuel supplied from the common rail 6 is therefore directly injected into the associated cylinder 2 through multiple jets at the tip of the injection nozzle. The quantity of fuel injected from the injector 5 is controlled by controlling the current supply period. Injectors that use piezoelectric elements as actuators can be used instead of solenoid injectors.

The common rail 6 is equipped with a fuel pressure sensor 8 for detecting the internal fuel pressure (the common rail pressure). The common rail 6 is connected to a fuel supply pump 10 by a high-pressure fuel supply line 9, and the fuel supply pump 10 is connected to a fuel tank 13 by a fuel supply line 12.

The fuel supply pump 10 is driven by rotation supplied to its drive shaft 14 from a crankshaft 15 of the main engine unit 1. The fuel supply pump 10 sucks fuel from the interior of the fuel tank 13 through the fuel supply line 12 and delivers it through the high-pressure fuel supply line 9 to the common rail 6. This embodiment is configured so that the common rail pressure can be varied by controlling the operation of the fuel supply pump 10.

The fuel supply line 12 is provided midway with a fuel filter 16 equipped with a heater. The fuel supply pump 10 is equipped with a solenoid-type pressure regulator 17 that regulates pressure by allowing a portion of the pressurized fuel to escape to a fuel return line 19.

The common rail 6 is equipped with a pressure limiter 18 that discharges fuel from the common rail 6 when the common rail pressure exceeds a prescribed value. The fuel discharged from the pressure limiter 18 is returned to the fuel tank 13 through the fuel return line 19 used to return part of the fuel from the injectors 5 to the fuel tank 13.

The main engine unit 1 is equipped with a crankangle sensor 20 for detecting the rotation angle of the crankshaft 15, a cam angle sensor 21 for detecting the rotation angle of a cam shaft, and a coolant temperature sensor 22 for detecting coolant temperature.

Although not shown, the crankangle sensor 20 is equipped with a detected plate provided at the tip of the crankshaft and a magnetic pickup located to face the outer periphery of the detected plate. The crankangle sensor 20 outputs pulses in response to the passage of teeth (projections) formed at regular spacing (e.g., 15 degree CA (crankangle) spacing) over the whole outer periphery of the detected plate. In this embodiment, the rotational speed of the crankshaft can be detected based on this pulse signal.

Although not shown, the cam angle sensor 21 is, similarly to the crankangle sensor 20, equipped with a magnetic pickup that outputs pulses in response to the passage of multiple teeth (projections) formed at an appropriate location on the peripheral surface of the cam shaft.

An air intake passage 24 for supplying air filtered through an air cleaner 23 into the cylinders 2 is connected to one side of the main engine unit 1 (left side in FIG. 1). A surge tank 25 is provided at the downstream end portion of the air intake passage 24. The surge tank 25 is connected to air intake ports 26 of the respective cylinders 2 through branch passages.

The portion of the air intake passage 24 upstream of the surge tank 25 is equipped from the upstream side toward the downstream side with an airflow sensor 28 for detecting the flow rate of the intake air, a blower 29 that is a component of a turbo supercharger, an intercooler 30 for cooling air compressed by the blower 29, an intake air temperature sensor 31, an intake air pressure sensor 32, and an intake air shutter valve 33 operated by negative pressure.

The intake air shutter valve 33 is opened and closed by a negative-pressure actuator 34. The negative-pressure actuator 34 utilizes a vacuum pump 35 driven by the crankshaft 15 as a negative pressure source. Its operating pressure is controlled by two solenoid valves 36, 37 so as to maintain the intake air shutter valve 33 in an arbitrary state between fully closed and wide open in accordance with the engine operating state. The intake air shutter valve 33 is designed to allow inflow of air even when fully closed.

A swirl control valve 38 operated by negative pressure is installed in a branch passage 27 connecting the surge tank 25 and the air intake port 26 of the respective cylinders 2. The swirl control valve 38 is opened and closed by a load actuator 39. The load actuator 39 utilizes the vacuum pump 35 as a negative pressure source and opens/closes the swirl control valve 38 in accordance with the engine operating state under the control of a solenoid valve 40.

An exhaust manifold 41 for discharging exhaust gas from the cylinders 2 is connected to a side portion of the main engine unit 1 on the opposite side (right side in FIG. 1). An exhaust passage 42 is connected to a downstream confluence portion of the exhaust manifold 41. The exhaust passage 42 is equipped from the upstream side toward the downstream side with a turbine 43 that is a component of the turbo supercharger, a pre catalytic converter 44 and main catalytic converter 45 for removing noxious components (unburned HC, CO, NOx, PM etc.) present in the exhaust gas, and a muffler 46.

The turbine 43 in the exhaust passage 42 and the blower 29 in the air intake passage 24 constitute a turbo supercharger 47. Although not illustrated in detail, the turbo supercharger 47 is a so-called VGT (variable geometry turbo) using a movable flap to change the sectional area (nozzle sectional area) of the exhaust passage to the turbine 43. The flap is rotated by a negative-pressure actuator 48 that uses the vacuum pump 35 as a negative pressure source. It is maintained in a prescribed rotational position under negative pressure control by a solenoid 49. The negative pressure from the vacuum pump 35 is led through a one-way valve 51 to a vacuum chamber 50 provided in the air cleaner 23 and from the vacuum chamber 50 through the solenoid 49 to the negative-pressure actuator 48.

An exhaust gas recirculation (EGR) passage 52 is provided for recirculating a part of the exhaust gas from the exhaust manifold 41 to a point downstream of the intake air shutter valve 33 in the air intake passage 24, and an exhaust gas recirculation (EGR) regulation valve 53 whose degree of opening can be regulated by negative-pressure operation is provided in the EGR passage 52. The EGR valve 53 is opened and closed using the vacuum pump 35 as a negative pressure source. The operating pressure of the EGR valve 53 is regulated by two solenoids 54, 55 so as to linearly vary the sectional area of the EGR passage 52 and thus regulate the flow rate of the exhaust gas recirculated to the air intake passage 24.

The operation of the injectors 5 of the respective cylinders, the fuel supply pump 10, the intake air shutter valve 33, the turbo supercharger (turbine 43), the EGR valve 53 etc. is controlled by an electronic control unit (ECU) 57.

The ECU 57 is input with various signals, including the output signal of the fuel pressure sensor 8, the output signal from the crankangle sensor 20, the output signal of the cam angle sensor 21, the output signal of the coolant temperature sensor 22, the output signal of the airflow sensor 28, the output signals of the intake air temperature sensor 31 and intake air pressure sensor 32, and an accelerator pedal depression signal from an accelerator pedal depression sensor (not shown).

The ECU 57 decides a desired fuel injection quantity based mainly on the amount of accelerator pedal depression, controls the supply of electric current to the injectors 5, and controls the fuel injection quantity and fuel injection time point. It also controls the operation of the fuel supply pump 10 so as to control the common rail pressure, i.e., the fuel injection pressure.

In this embodiment, a basic injection quantity map defining basic fuel injection quantities in relation to desired engine torque and engine speed is stored in a memory of the ECU 57. First, the basic injection quantity is read from the basic injection quantity map using as address data the desired torque calculated from the output signal of the accelerator pedal depression sensor and engine rpm calculated from the output signal of the crankangle sensor 20. Next, the injection quantity is determined by correcting the basic injection quantity for the coolant temperature, supercharge pressure and the like. Next, the current supply period required to achieve the determined injection quantity is determined based on a map defining the relationship between current supply period and injection quantity stored in the ECU 57.

The fuel injection time point is similarly determined and the current supply time point is determined accordingly.

In this embodiment, fuel injection in the high-load region is conducted all at one time near the top dead center (TDC) of the compression stroke. In the low-load and medium-load regions split fuel injection is conducted, i.e., the amount of fuel for each stroke is divided into portions for injection. Specifically; during the compression stroke a prescribe amount of fuel (e.g., 10–40% of the amount of the main injection conducted later) is injected first as a pilot injection and the remaining fuel is injected near TDC as the main injection.

Moreover, the need to increase fuel injection quantity in proportion as the state of engine operation shifts to the high load side is met by advancing the start time point of the main injection.

Supply of electric current to the injectors 5 is conducted based on the current supply time point and current supply period determined in this manner.

In the control of EGR valve 53 operation (EGR control), a common desired excess air ratio is, for example, set for all cylinders 2 according to the engine operating state, the actual amount of intake air supplied to the cylinders 2 is detected from the output signal of the airflow sensor 28, and the amount of exhaust gas recirculation is controlled based on the detected value and the fuel injection quantity of each cylinder 2 so as to achieve the desired excess air ratio. In other words, by regulating the exhaust gas recirculation for each cylinder 2, the amount new intake air is varied to control the excess air ratio in each cylinder 2 to the desired excess air ratio.

In the control of the intake air shutter valve 33, in order to enable recirculation of a prescribed amount of exhaust gas by the EGR control, the intake air shutter valve 33 is, chiefly when the engine is idling, fully closed to produce negative pressure in the air intake passage 24. In operating states other than idling, the intake air shutter valve 33 is generally kept wide open.

In the control system of this embodiment, the ECU 57, for example, conducts correction control for correcting the map defining the relationship between the period of current supply and the quantity of fuel injection to the injectors 5 of the cylinders 2.

This correction control is automatically initiated once every 100 turn-ons of the ignition (IG) switch or every 10,000 Km of vehicle travel, when all of a set of prescribed conditions are met, namely, when the coolant temperature is in the range of 60–85° C., the outdoor air temperature is in the range of 0–35° C., and 40 seconds have passed since idling was discriminated. This correction control is also initiated when a test terminal ON signal is input at the time of, for example, completion of vehicle manufacture.

While the correction control is in progress, the common rail pressure is held constant and, as shown in FIG. 2, the injection state at all cylinders (#1 to #4) is split fuel injection in which the fuel is dividedly injected in equal amounts five or four times. In addition, the period of current supply to the injectors 5 is simultaneously varied at all cylinders 2 so as to realize a stable idling speed. At the same time, the fuel state at each cylinder is estimated based on change in crankangle speed, and inter-cylinder correction is conducted for adjusting the periods of current supply to the injectors 5 so to make the quantity of fuel injected into the cylinders uniform. When a stable idling speed is obtained, the current supply periods at that time are defined as the current supply periods for injecting the fuel injection quantity required to achieve a stable idling speed. The map defining the relationship between current supply period and fuel injection quantity for each injector is corrected based on these current supply periods.

Figure 3:
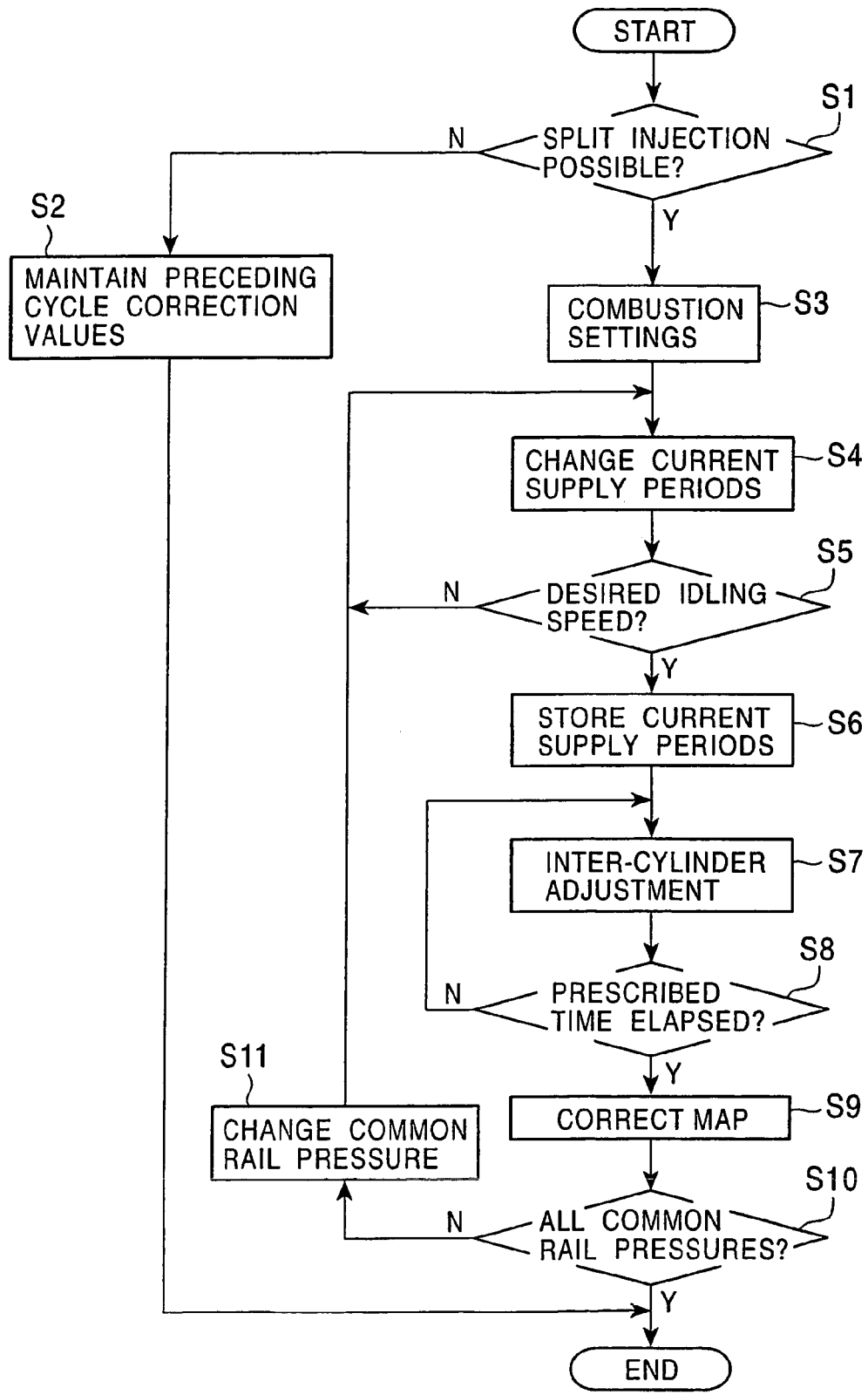
FIG. 3 is a flowchart showing the details of processing executed by an ECU for effecting correction control in the first embodiment of the present invention.

The particulars of the correction control conducted by the control system of this first embodiment will now be explained. FIG. 3 is a flowchart showing the details of processing executed by the ECU 57 during correction control.

Immediately after activation of the routine, in step S1, it is decided whether the fuel injection quantity enables split fuel injection in five portions. A NO result in step S1 is judged to mean that something is abnormal and control passes to step S2, in which the correction value in the preceding cycle is maintained. When the result in S1 is YES, control passes to step S3, in which all settings related to combustion are fixed. In other words, control using the EGR valve 53, intake air shutter valve 33 and swirl control valve 38 is terminated and the VGT desired supercharge pressure is fixed. In addition, the common rail pressure (injection pressure) is set at 35 Mpa and split fuel injection is conducted in which the injectors 5 inject fuel divided into five equal portions. In consideration of the effect of the pressure waves produced by opening and closing of the injectors 5 at this time, interval correction is conducted for equalizing the injection among the injection steps.

Next, in step S4, periods of current supply to the injectors 5 of all cylinders are simultaneously varied to regulate the fuel injection quantity so as to achieve the desired idling speed of the engine. Then, in step S5, it is discriminated whether the desired idling speed was obtained. When the result in S5 is NO, control is returned to step S4 and the fuel injection quantity is again regulated by changing the periods of current supply to the injectors 5 of all cylinders. When the result in step S5 is YES, control passes to step S6 in which the periods of current supply to the injectors 5 at the time the desired idling speed was obtained are stored in memory as the current supply periods required to obtain the desired idling speed. Specifically, these current supply periods correspond to an injection amount obtained by dividing the per-cycle fuel injection quantity required to obtain the desired idling speed (the required injection quantity) into five equal portions. If the required injection quantity of the engine is, for instance, 5 cubic millimeter, the injection quantity of each divided injection is this amount divided by five, or one cubic millimeter. The current supply periods required for injecting 1 cubic milliliter of fuel are therefore obtained.

Figure 4:
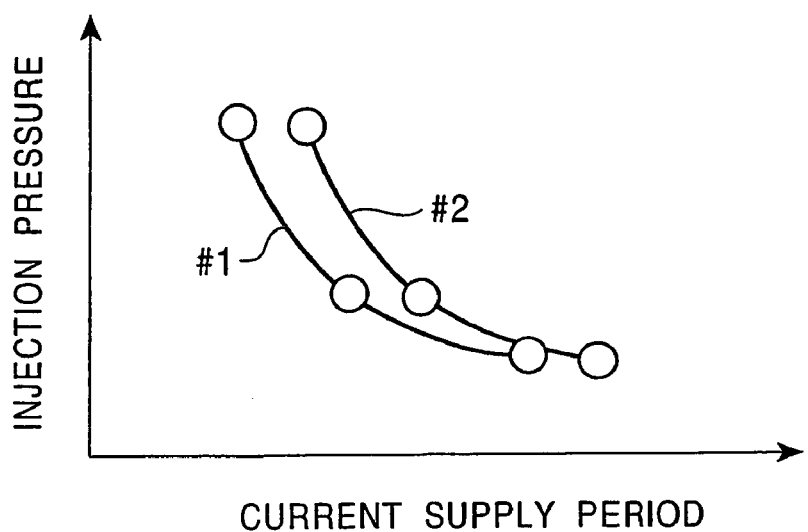
FIG. 4 is a graph showing how injection pressure varies with current supply period.
Figure 5:
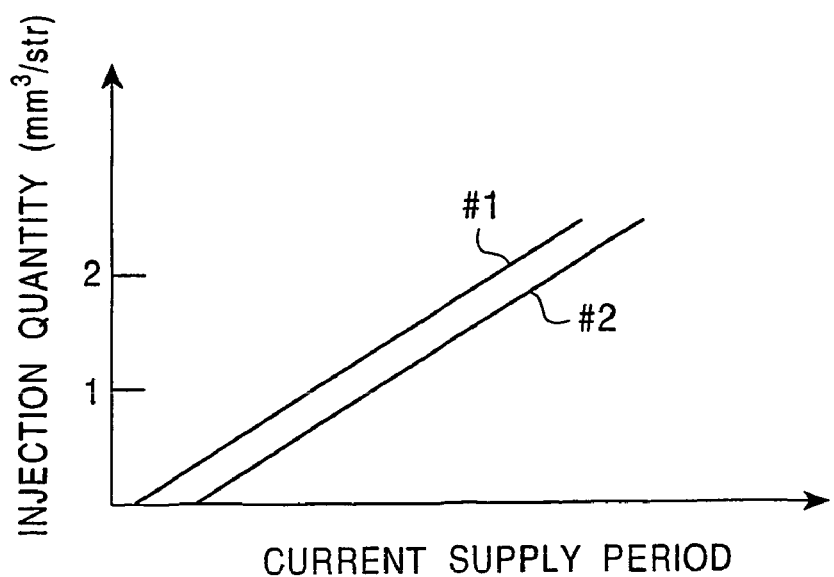
FIG. 5 is a graph showing how injection quantity varies with current supply period.

Next, in step S7, one of the four cylinders is defined as a reference cylinder and the fuel injection quantities from the injectors of the other cylinders are brought into coincidence with the fuel injection quantity from the injector of the reference cylinder, thereby making the fuel injection quantity from the injectors 5 the same at all cylinders. Specifically, the first cylinder, for example, is defined as the reference cylinder and the periods of current supply to the injector 5 of the first cylinder are fixed so as to make the injection quantities of the divided injections uniform at the first cylinder. Inter-cylinder correction is then conducted to adjust the periods of current supply to the injectors 5 of the other cylinders 2 so as to make the rotational speed difference of the crankshaft (angular speed change) at the time of explosion in the other cylinders equal to the rotational speed difference at the time of explosion in the first cylinder. Since, as shown in FIG. 4, the relationship between injection pressure and current supply period differs between different injectors, the injection quantity differs between cylinders even when the current supply period is the same, as shown in FIG. 5. However, this difference is eliminated by the inter-cylinder correction.

Next, in step S8, it is checked whether a prescribed period or prescribed cycle established as a wait time or cycle for stabilization of engine speed or inter-cylinder variation has elapsed. When the result in step S8 is NO, i.e., if the prescribed time or cycle has not elapsed, control returns to step S7. When the result in step S8 is YES, i.e., if it is found that the prescribed time or cycle has passed, control passes to step S9, in which the map stored in ECU 57 defining the relationship between current supply period and fuel injection quantity for each injector is corrected based on the relationship between current supply period and injection quantity at the common rail pressure of the current cycle (35 Mpa) obtained in step S4.

Figure 7:
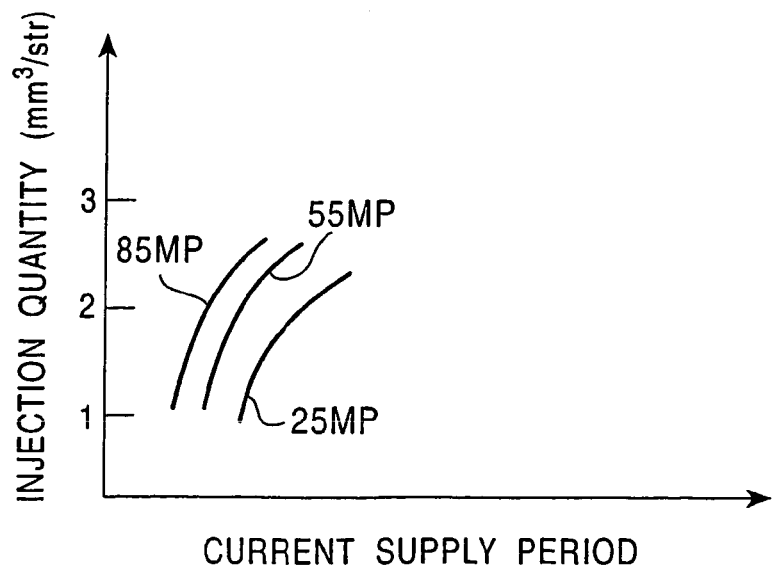
FIG. 7 is a graph showing how fuel injection quantity varies with current supply period at different injection pressures.

Next, in step S10, it is checked whether correction control has been completed for three different common rail pressures. When the result is NO, control passes to step S11 in which the desired common rail pressure is changed to a pressure for which correction control has not yet been conducted (55 Mpa or 85 Mpa), whereafter control returns to step S5. When the result in step S9 is YES, the correction control is terminated. The common rail pressure is best changed in order from the lowest to the highest. As shown in FIG. 7, the relationship between current supply period and fuel injection quantity is obtained at each injection pressure for every injector. It should be noted that although the number of injection steps is maintained constant for the same injection pressure, the correction control can be conducted using a reduced number injection steps such as four when the injection pressure is high.

Since this correction control corrects for differences in injection quantity for the same current supply period that may be present among the injectors 5 owing to differences in their individual characteristics, deterioration with aging and the like, it enables uniform fuel injection among all cylinders.

Figure 6:
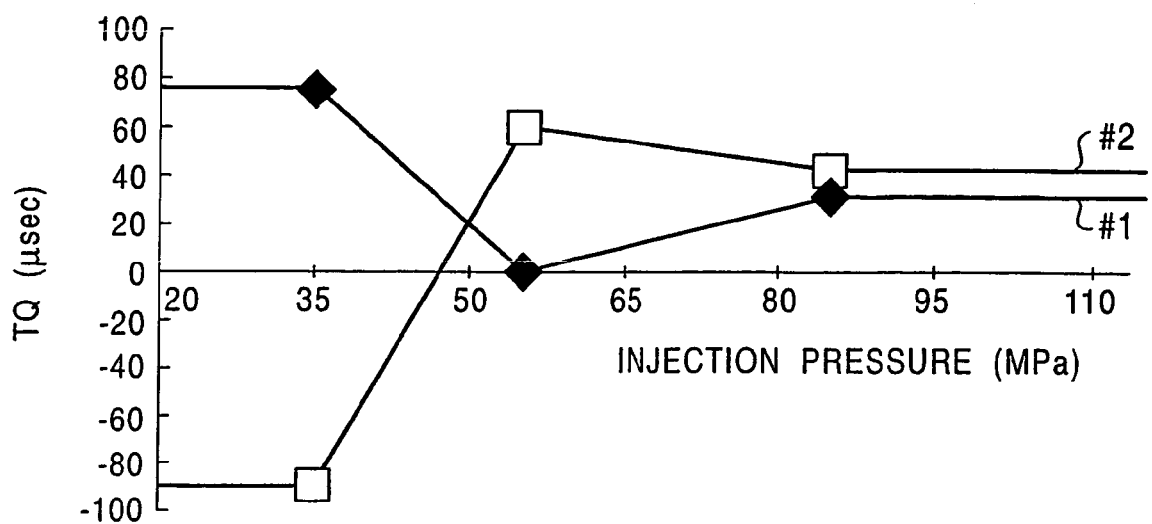
FIG. 6 is a graph showing deviation TQ between actual current supply period and a reference current supply period.

In the map correction, it is preferable to calculate the deviation TQ between actual current supply period and a prescribed basic current supply period for each cylinder and each common rail pressure, update the map using this deviation as a correction value, and reflect this deviation in the correction of current supply period at common rail pressures other than those used in the correction control. As shown in FIG. 6, however, at common rail pressures below the lower limit (35 Mpa) and above the upper limit (85 Mpa) of the injection pressures actually learned, the correction values at the lower limit and the upper limit are preferably maintained.

By the control system according to this first embodiment, when the required injection quantity per cycle is, for example, 5 cubic millimeters, the control system can establish the current supply periods required for injecting the fuel in five portions of 1 cubic milliliter each. It can therefore achieve accurate injection of even small quantities of fuel.

In the embodiment described in the foregoing, the correction control implemented by the routine of the flowchart fixes the number of injection steps of the split fuel injection at five. Instead, however, the control can be conducted while successively changing the number of split fuel injection steps in the course of the same processing session. Such control enables still finer map correction.

While the first embodiment is configured to establish the same injection quantity at every step of the split fuel injection, the injection quantity can instead be made different between different steps. In this case, current supply periods for accurate injection in the small injection region can be established by effecting control in which at least the current supply period of the injection step in which the injection quantity is minimum is varied.

Second Embodiment

The control system according to the second embodiment detects the lower limit value of pilot injection (the current supply period at the misfire limit) by the misfire detection method and conducts engine control based on the detected value. The basic configuration of the engine control system of the second embodiment is the same as that of the first embodiment.

The correction control is conducted by establishing a condition under which the engine misfires if pilot injection is not effected, deliberately creating a misfire state by changing the current supply period for the pilot injection, defining the current supply period at the time misfire was detected (the misfire limit) as the minimum current supply period for pilot injection, and correcting the map for pilot injection.

Figure 8:
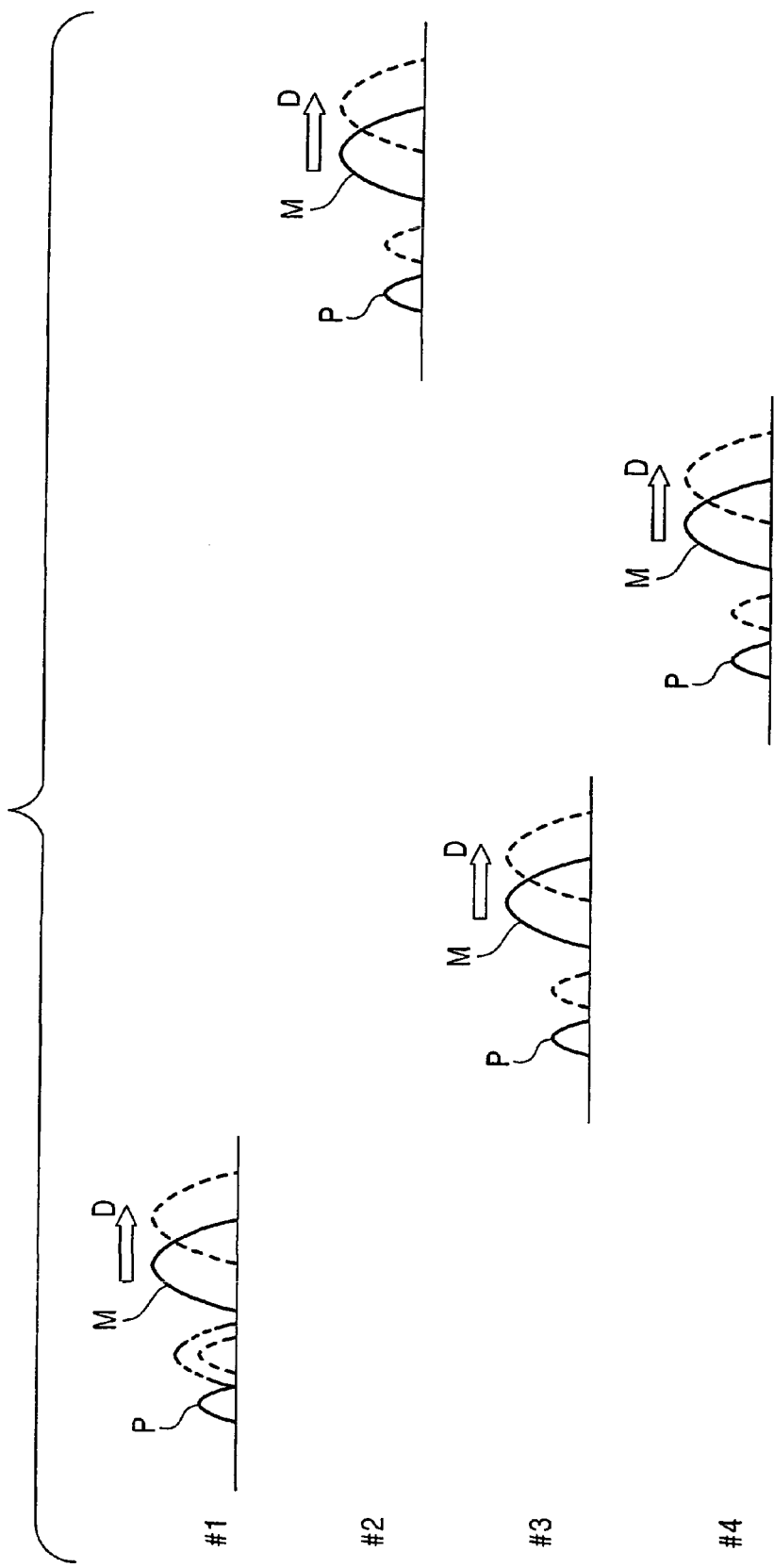
FIG. 8 is a time chart for explaining an injection state in a second embodiment of the present invention.

Specifically, idling operation is first established by, as exemplified in FIG. 8, conducting fuel injection composed of pilot injection and main injection at each cylinder. Next, the injection time point of the total injection quantity consisting of the sum of the injection quantity of the main injection and the injection quantity of the pilot injection (the required injection quantity) is retarded at all cylinders to the limit injection time point (broken line curves) at which misfire occurs when injection is solely by main injection, as indicated by the arrow $D$ in FIG. 8.

Next, the misfire limit is detected in this retarded state by, with respect to one cylinder that is the subject of the correction (the first cylinder #1, for example), changing (gradually decreasing or increasing) the current supply period that produces the pilot injection P, as indicated by the double broken line curve, without changing the total injection quantity per cycle.

The detected current supply period at the misfire limit is the defined as the lower limit value of the current supply period for pilot injection at the cylinder that is the subject of the correction (hereinafter called the "subject cylinder") and this value is stored as the updated value.

Next, detection of the misfire limit is similarly detected for the cylinder at a different common rail pressure and the lower limit value of the current supply period is updated.

It suffices to retard the injection time point only with respect to the subject cylinder (the first cylinder in FIG. 8). However, the misfire limit detection is preferably conducted for every cylinder and at different common rail pressures, such as 35 Mpa, 55 Mpa and 85 Mpa. At a high injection pressure (e.g., 85 Mpa), the engine noise becomes loud and may make the user think that something is wrong, so it is better to control the retardation at every cylinder so as to produce less noisy semi-misfire.

Figure 9:
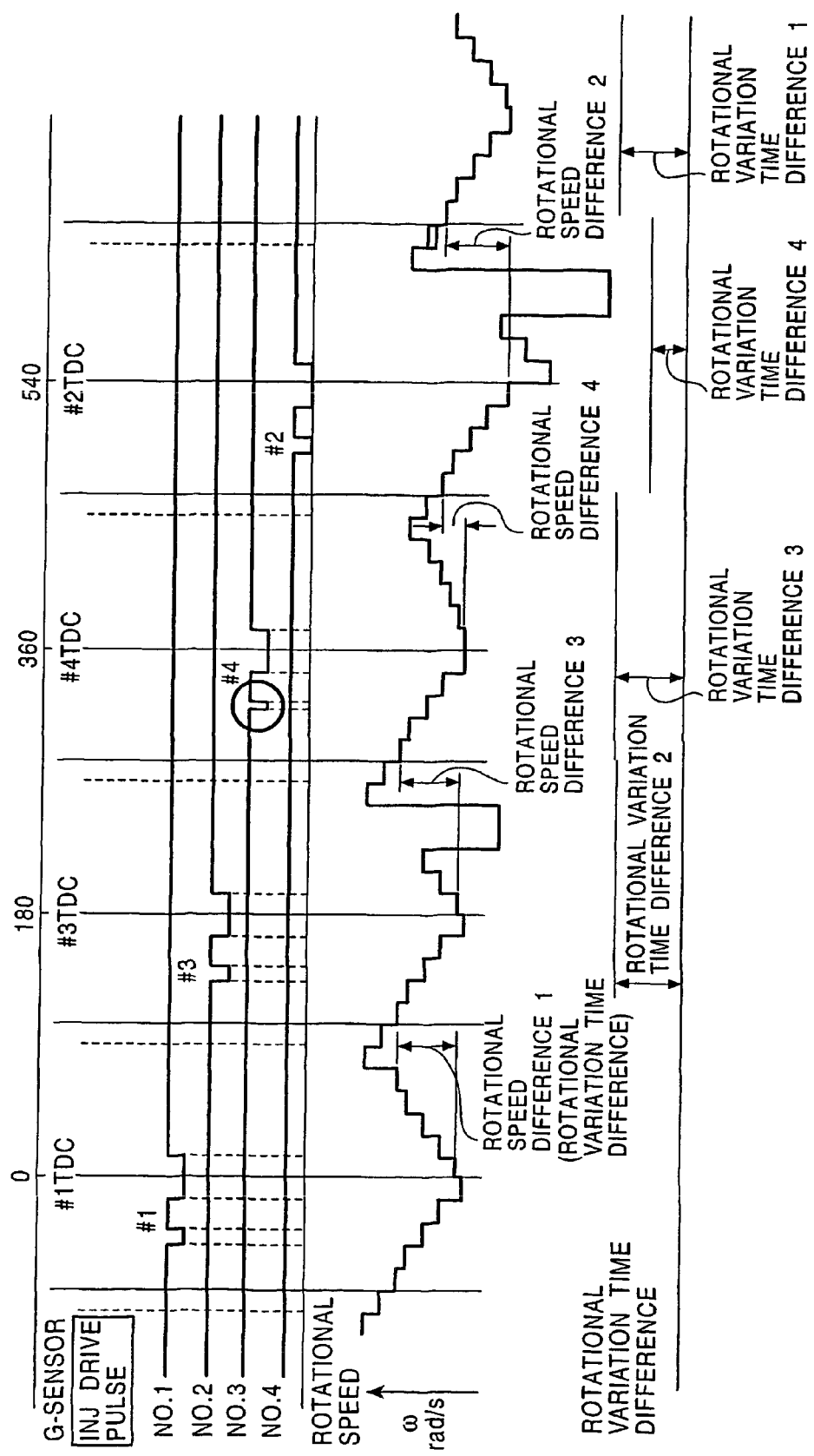
FIG. 9 is a time chart showing crankshaft rotational speed etc. of individual cylinders during correction control in the second embodiment of the present invention.

In the second embodiment, the misfire limit is detected from engine rotational speed variation (angular speed variation). As was explained with respect to the first embodiment, the detected plate of the crankangle sensor 20 is formed on its peripheral portion with teeth spaced at intervals of 15 degrees CA (crankangle). A value is calculated from the time difference between the transit time of one of these teeth, say the seventh tooth that detected the TDC of the third cylinder #3 one earlier in firing order than the fourth cylinder #4 assumed here to be the subject cylinder, and the transit time of the second tooth that detected ATDC 105 degrees CA. This calculated value is defined as the rotational speed time difference (rotational speed time difference 4) corresponding to the rotational speed difference (rotational speed difference 4), i.e., as the rotational speed variation. The point at which this calculated value exceeds a prescribed value is defined as the misfire limit and the current supply period of the pilot injection to the subject cylinder (fourth cylinder #4) is defined as the current supply period lower limit value for pilot injection (FIG. 9).

Thus, in this manner, misfire limit detection utilizing rotational speed variation can be achieved by checking whether the rotational speed difference (rotational speed time difference) is equal to or greater than a prescribed value (absolute value). The current supply period at the detected misfire limit, or a current supply period obtained by adding to the current supply period a prescribed current supply period in the interest of combustion stability, is defined as the lower limit of the current supply period of the fuel injection control.

Figure 10:
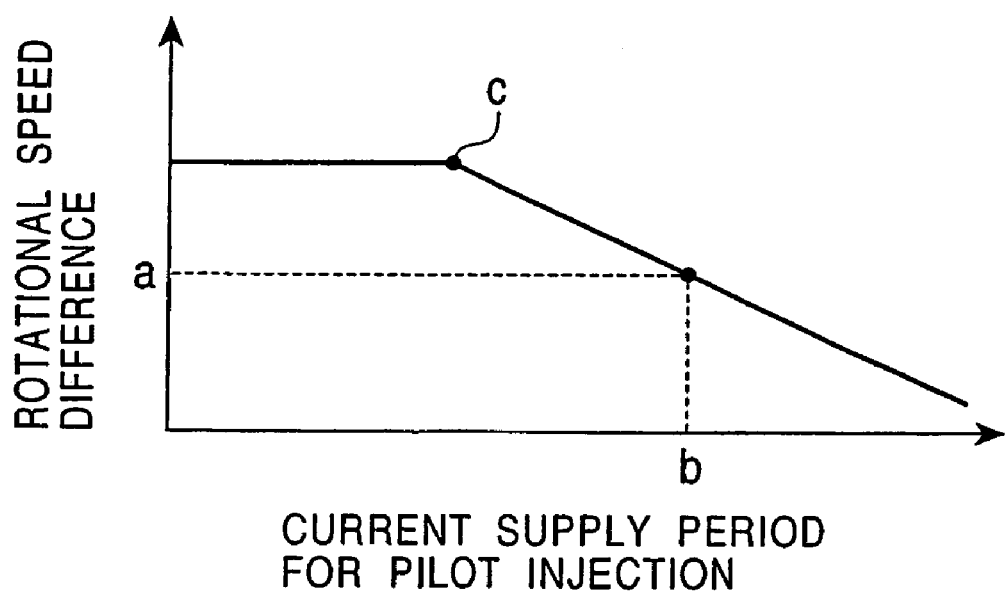
FIG. 10 is a graph for explaining an example of setting a threshold in the second embodiment of the present invention.

As shown in FIG. 10, for example, a threshold $b$ can be defined on the smaller rotational speed difference side of the misfire limit rotational speed difference (stable combustions side) and the map be corrected assuming the current supply period $b$ when the rotational speed difference becomes $a$ to be the lower limit value of the current supply period.

Otherwise the misfire inflection point indicated by $c$ in FIG. 10 can be used as a reference and the threshold $a$ be defined at a point a prescribed amount below the inflection point $c$ (where the rotational speed variation difference is small and ignition is stable).

It is also possible to discriminate misfire based on the rotational speed difference relative to another cylinder. For example, the lower limit value of the current supply period can be obtained from the rotational speed difference between the first cylinder and the fourth cylinder when rotational speed of the first cylinder is being detected or from the rotational speed difference between the third cylinder and the second cylinder when the rotational speed of the third rotational speed is being detected.

Preferably, the common rail pressure (injection pressure) is changed to multiple injection pressures usable in the practical range, e.g., to 35 Mpa, 55 Mpa and 85 Mpa, the misfire limit is detected a prescribed number of times at each injection pressure, and the results learned for each cylinder at each pressure are reflected in the correction at other injection pressures. The common rail pressure is best changed in order from the lowest to the highest.

When the cylinder whose misfire limit is currently being detected and the cylinder whose misfire limit is to be next detected are adjacent in firing order, the latter cylinder may be affected by the angular speed variation and misfire, leading to consecutive misfires and stalling. In an engine whose firing order is first cylinder (#1), third cylinder (#3), fourth cylinder (#4) and second cylinder (#2), therefore, misfire detection is preferably conducted in the order of first cylinder, second cylinder, fourth cylinder and third cylinder.

Figure 11:
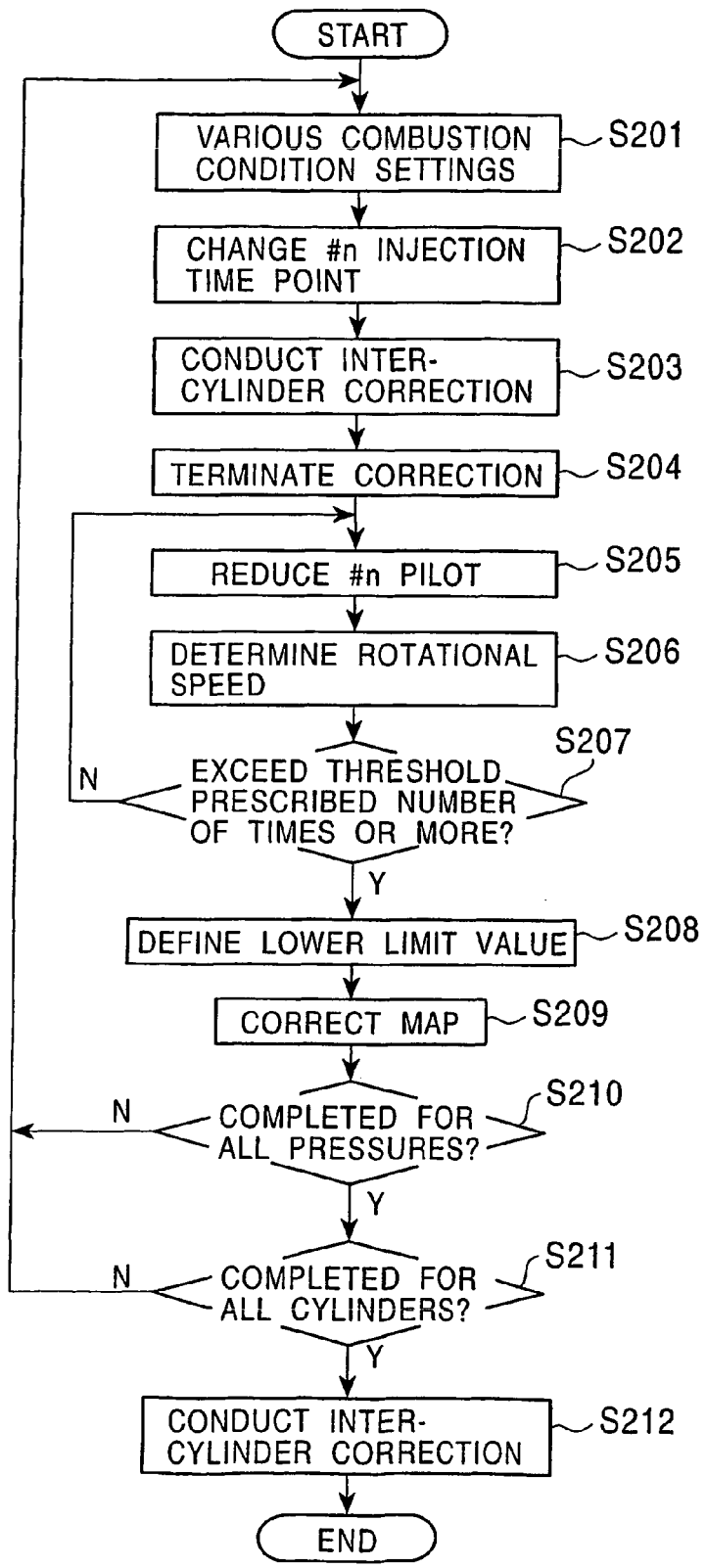
FIG. 11 is a flowchart showing the details of processing executed by an ECU for effecting correction control in the second embodiment of the present invention.

The particulars of the correction control conducted by the control system of the second embodiment will now be explained. FIG. 11 is a flowchart showing the details of processing executed by an ECU 57 for effecting correction control in the second embodiment of the present invention.

As in the first embodiment, the correction control conducted by the control system of this embodiment is also automatically initiated once every 100 turn-ons of the ignition (IG) switch or every 10,000 Km of vehicle travel, when all of a set of prescribed conditions are met, namely, when the coolant temperature is in the range of 60–85° C., the outdoor air temperature is in the range of 0–35° C., and 40 seconds have passed since idling was discriminated. This correction control is also initiated when a test terminal ON signal is input at the time of, for example, completion of vehicle manufacture.

Immediately after activation of the routine, in step S201, all settings related to combustion are fixed in order to obtain a stable idling state. In other words, control using the EGR valve 53, intake air shutter valve 33 and swirl control valve 38 is terminated and the VGT desired supercharge pressure is fixed. In addition, the common rail pressure (injection pressure) is fixed at 35 Mpa Further, a Q instruction value (pilot injection instruction value), which is the current supply period for pilot injection with respect to cylinders (#n) to be corrected in a prescribed order, is fixed, the main injection time point is fixed, and the pilot interval is fixed in consideration of the effect of the pressure waves produced by opening and closing of the injectors 5.

Next, is step S202, the injection time point of only the cylinder (#n) that is the subject of the correction (hereinafter called the "subject cylinder) is retarded to and fixed at a point just before the misfire limit and, in line with this, the main injection time point and the pilot interval are again changed and fixed. The injection time point and the pilot interval of the subject cylinder (#n) are set to establish a condition in which misfire occurs without fail when the pilot injection become zero. This condition differs depending on the common rail pressure. The injection time points and pilot intervals of the other cylinders can also be similarly changed at the time.

Next, in step S203, the engine speed is stabilized by idling speed control (ISC) utilizing fuel injection quantity (current supply period) regulation and inter-cylinder correction is conducted to regulate the fuel injection quantity at every cylinder so as make the rotational speed (angular velocity) variation uniform among the cylinders. The inter-cylinder correction at this time is conducted by changing only the current supply period of the main injection.

Next, in step S204, the inter-cylinder correction is terminated. The correction values of the inter-cylinder correction of the injectors 5 are saved.

Next, in step S205, the current supply period of the pilot injection of the injector of the subject cylinder (#n) is gradually reduced and the current supply period of the main injection is increased by the amount of the reduction. Next, in step S206, the rotational speed of the crankshaft at explosion in the subject cylinder (#n) is detected a prescribed number of times.

Further, in step S207, it is checked whether the number of times that the difference between the detected rotational speed and a reference speed exceeded a threshold is equal to or greater than a prescribed number of times. When the result in step S207 is YES, misfire is found to have occurred. When the result in step S207 is NO, it is judged that misfire did not occur and control is returned to step S205 to repeat the processing of steps S205 to 207.

When the result in step S207 is YES, control passes to step S208, in which the current supply period (TQ) of the pilot injection at misfire is defined as the lower limit value. Next, in step S209, a prescribed allowance (α) is added to the lower limit value (TQ), the sum is defined as the pilot injection current supply period (TQ) of the subject cylinder (#n), and the map indicating the relationship between fuel injection quantity and current supply for each injector period is corrected. This concludes the learning at the first injection pressure stage with respect to the cylinder (#n) that was the subject of the learning. In consideration of degradation from the time of the preceding correction, the Q instruction value is defined as the sum of the value at the preceding correction and a certain guard value (e.g., preceding cylinder TQ value+0.5).

Next, in step S210, it is checked whether setting of the pilot injection current supply period (TQ) has been completed for all three common rail pressures. When the result in step S210 is NO, control returns to step S210, the desired value of the common rail pressure is changed to 55 Mpa or 85 Mpa, and steps S201 to S209 are repeated. The common rail pressure is best changed in order from the lowest to the highest.

When the result in S210 is YES, i.e., when the determination of misfire limit has been completed for the three common rail pressures, control passes to step S211, in which it is checked whether misfire limit determination has been completed for all four cylinders.

When the result in S211 is NO, control returns to step S201, the subject cylinder is changed, and steps S201 to S210 are repeated until correction for all cylinders is completed. When determination of misfire limit has been completed for all cylinders, control passes to step S212, in which the normal conditions are restored, ISC and inter-cylinder correction control are conducted, and the control is terminated. The correction amount at this time reflects only the injection instruction value Q of the main injection.

Figure 12:
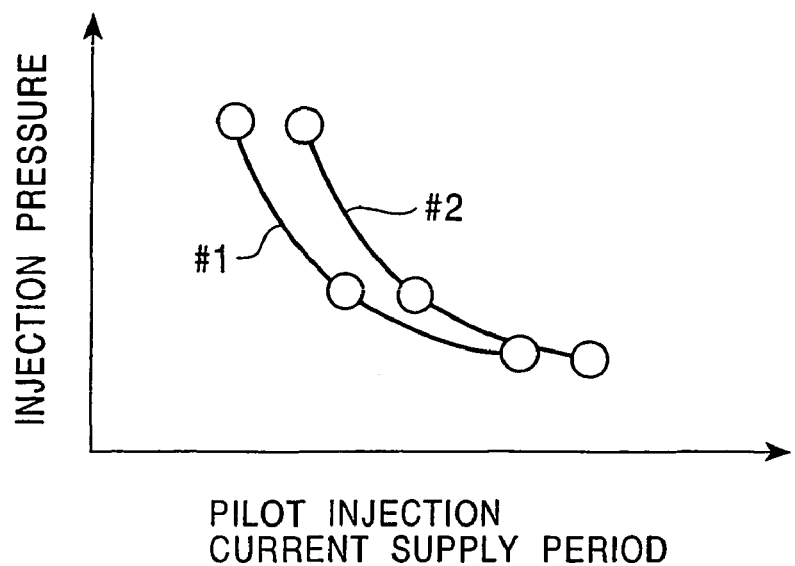
FIG. 12 is a graph showing how injection pressure varies with current supply period.
Figure 13:
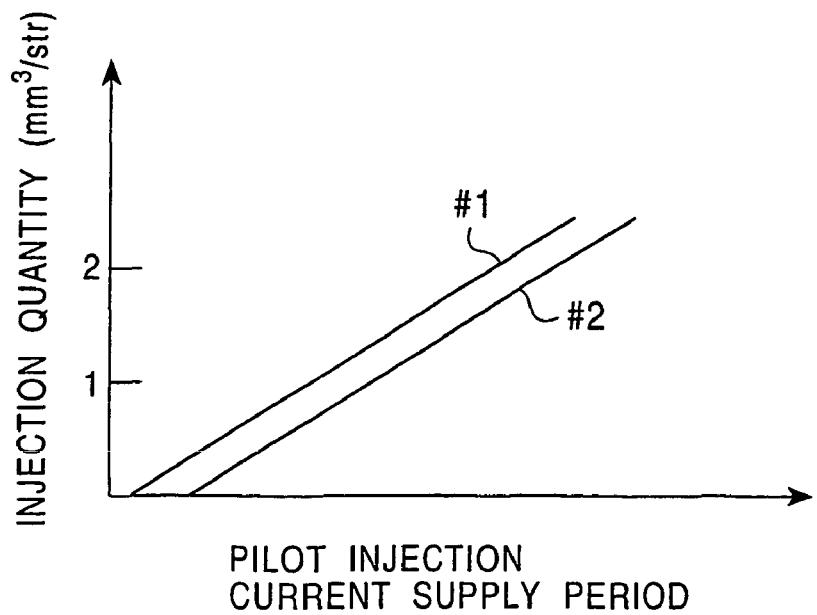
FIG. 13 is a graph showing how injection quantity varies with current supply period.

As shown in FIG. 12, the tendency of the current supply period-injection quantity characteristic of the injectors differs individually, so that, as shown in FIG. 13, the injection pressure differs even when the current supply period is the same. Although this causes variation in injection quantity among the individual cylinders, this variation is eliminated by the correction control of this embodiment.

In this second embodiment, the main injection quantity is changed with change in the pilot injection quantity so as to maintain the total quantity of pilot injection and main injection constant. Alternatively, the main injection quantity can be maintained constant and only the pilot injection quantity changed.

Since various requirements for achieving optimum correction, such as the injection time point and interval and the like, differ depending on the applied common rail pressure (injection pressure), the foregoing embodiments are preferably configured to set the injection time point, interval and the like separately for each common rail pressure.

Further, in the second embodiment, it is possible to provide a routine for verifying the correction results after every injection pressure or cylinder correction and before proceeding to the next injection pressure or cylinder correction, conduct about ten operation cycles, and then move on to the next correction if no misfire is found.

Further, a configuration can be adopted in which the correction control is terminated when deviation from the original correction conditions or the idling region occurs in the course of correction control.

A configuration can also be adopted wherein no further learning is conducted until the next ignition switch turn-on when ten or more consecutive NO results are obtained in step S8 of the flowchart of FIG. 3 or step S207 of the flow chart of FIG. 11.

Completion flags can be established by cylinder and by pressure so that when the correction control is terminated midway, it can be resumed from the point of termination the next time.

The multistage injection method of the first embodiment and the misfire detection method of the second method can be combined for conducting misfire limit learning and correcting the injection quantity characteristics within the range of fuel injection quantity change in the practical region.

The present invention can be applied to a diesel engine that, for example, utilizes as injectors for fuel injection ones equipped with actuators operated by piezoelectric elements.

The present invention is not limited to application to pilot injection but can be widely applied to various types of split fuel injection, including split fuel injection that divides injection into two, three or more approximately equal portions during low-speed, low-load operation, and after-injection conducted in the expansion stroke after main injection.

What is claimed is:

1. A diesel engine control system comprising:
   an injector for directly injecting fuel into a combustion chamber of a diesel engine having multiple cylinders;
   injection quantity controlling means for controlling fuel injection quantity by varying a period of electric current supply to the injector;
   estimating means for conducting split fuel injection that divides the amount of fuel injected during each cycle into multiple injections in idling and for estimating that an electric current supply period when a prescribed combustion state is obtained is the current supply period for injecting the amount of fuel required for the stable idling speed; and control data correcting means for correcting control data of the injection quantity controlling means based on the estimated current supply period;

wherein said estimating means and control data correcting means estimate the current supply period and correct the control data separately for each cylinder.

2. A system according to claim 1, wherein:

the estimating means and the control data correcting means conduct current supply period estimation and control data correction at multiple fuel injection pressures.

3. A system according to claim 2, wherein:

the control data correcting means calculates deviation between a preset basic current supply period and the estimated current supply period and, based on the calculated deviation, corrects the control data at injection pressures other than said multiple fuel injection pressures.

4. A diesel engine control system comprising:

an injector for directly injecting fuel into a combustion chamber of a diesel engine;

injection quantity controlling means for controlling fuel injection quantity by varying a period of electric current supply to the injector;

pilot injection control means operative in a prescribed operating state for causing the injector to conduct pilot injection of an injection quantity smaller than an injection quantity of a main injection prior to the main injection of fuel;

misfire generating means for generating a misfire state by varying the current supply period to change the injection quantity of the pilot injection;

misfire discriminating means for discriminating misfire state;

misfire limit setting means for setting the period of current supply to the injector when misfire is detected as a misfire limit current supply period; and pilot control correcting means for correcting control data of the pilot injection control means based on the misfire limit current supply period.

5. A system according to claim 4, wherein:

the misfire discriminating means discriminates misfire based on the rotational speed of the crank shaft.

6. A system according to claim 5, wherein:

the diesel engine is equipped with multiple cylinders; and the misfire discriminating means discriminates misfire state based on difference in the crankshaft rotational speed at the time of explosion in the misfiring cylinder and the crankshaft rotational speed at the time of explosion in another cylinder.

7. A system according to claim 6, wherein:

the misfire discriminating means discriminates occurrence of misfire state when the difference is equal to or greater than a prescribed value.

8. A system according to any of claims 4 to 7, wherein:

the pilot control correcting means sets a period obtained by adding a prescribed period to the misfire limit current supply period as the lower limit value of the current supply period for pilot injection.

9. A system according to claim 6, wherein:

the misfire generation, misfire discrimination, misfire limit setting and pilot control correction are each conducted at multiple fuel injection pressures.

10. A system according to any of claim 7, wherein:

the diesel engine is equipped with multiple cylinders; and the misfire generation, misfire discrimination, misfire limit setting and pilot control correction are conducted separately for each cylinder.

11. A system for controlling a diesel engine conducting split fuel injection that divides the amount of fuel injected during each main injection into multiple injections in a prescribed operating state, the system comprising:

an injector for directly injecting fuel into a combustion chamber of the diesel engine;

injection quantity controlling means for controlling fuel injection quantity by varying a period of electric current supply to the injector;

estimating means for estimating during the split fuel injection that an electric current supply period when a prescribed combustion state is obtained is the current supply period for injecting the amount of fuel required for the prescribed combustion state;

control data correcting means for correcting control data of the injection quantity controlling means based on the estimated current supply period;

pilot injection control means operative in a prescribed operating state for causing the injector to conduct pilot injection of an injection quantity smaller than an injection quantity of the main injection prior to the main injection of fuel;

misfire generating means for generating a misfire state by varying the current supply period to change the injection quantity of the pilot injection;

misfire discriminating means for discriminating misfire state;

misfire limit setting means for setting the period of current supply to the injector when misfire is detected as a misfire limit current supply period; and pilot control correcting means for correcting control data of the pilot injection control means based on the misfire limit current supply period.

12. A diesel engine control method that controls fuel injection quantity by varying a period of electric current supply to an injector for directly injecting fuel into a combustion chamber, the method comprising:

a step conducted in a prescribed operating state of causing the injector to conduct pilot injection of an injection quantity smaller than an injection quantity of a main injection prior to the main injection of fuel;

a step of generating a misfire state by varying the current supply period to change the injection quantity of the pilot injection;

a step of discriminating misfire state;

a step of setting the period of current supply to the injector when misfire is detected as a misfire limit current supply period; and a step of correcting control data of the pilot injection control means based on the misfire limit current supply period.

* * * * *